US008808819B2

(12) United States Patent
Oomori et al.

(10) Patent No.: US 8,808,819 B2

(45) Date of Patent: Aug. 19, 2014

(54) TUBULAR MEMBER, TUBULAR MEMBER UNIT, INTERMEDIATE TRANSFER MEMBER, AND IMAGE FORMING APPARATUS

(75) Inventors: Kenji Oomori, Kanagawa (JP); Tomoo Matsushima, Kanagawa (JP); Yousuke Tsutsumi, Kanagawa (JP); Shoichi Morita, Kanagawa (JP); Yutaka Sugizaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 230 days.

(21) Appl. No.: 13/292,604

(22) Filed: Nov. 9, 2011

(65) Prior Publication Data

US 2012/0243916 A1 Sep. 27, 2012

(30) Foreign Application Priority Data

Mar. 24, 2011 (JP) ................................ 2011-066473
Jun. 20, 2011 (JP) ................................ 2011-136343

(51) Int. Cl.
*B32B 1/08* (2006.01)
*G03G 15/01* (2006.01)
*G03G 15/08* (2006.01)
*G03G 15/20* (2006.01)

(52) U.S. Cl.
USPC ....... 428/36.9; 428/34.4; 428/34.7; 428/36.4; 428/36.91; 428/36.92; 399/121; 399/302; 399/308; 399/313

(58) Field of Classification Search
USPC ........... 428/34.4-34.7, 35.7, 36.4, 36.6, 36.9, 428/36.91, 36.92; 399/121, 302, 308, 313
See application file for complete search history.

(56) References Cited

U.S. PATENT DOCUMENTS

| | | | | |
|---|---|---|---|---|
| 7,026,432 | B2 * | 4/2006 | Charati et al. | 528/271 |
| 8,263,697 | B2 * | 9/2012 | Miyoshi et al. | 524/494 |
| 2004/0135371 | A1 * | 7/2004 | Masuda et al. | 285/423 |
| 2005/0142368 | A1 | 6/2005 | Sakurai et al. | |
| 2006/0067747 | A1 | 3/2006 | Matsuda et al. | |
| 2007/0282051 | A1 | 12/2007 | Okano | |
| 2009/0250842 | A1 | 10/2009 | Okano | |

FOREIGN PATENT DOCUMENTS

| | | |
|---|---|---|
| JP | A-2005-15731 | 1/2005 |
| JP | A-2006-119608 | 5/2006 |
| JP | A-2008-15491 | 1/2008 |
| JP | A-2003-202760 | 7/2008 |
| JP | A-2008-255303 | 10/2008 |
| JP | B2-4401939 | 1/2010 |

* cited by examiner

*Primary Examiner* — Walter B Aughenbaugh
(74) *Attorney, Agent, or Firm* — Oliff PLC

(57) ABSTRACT

A tubular member formed of a polyamide resin layer includes carbon black and a semi-aromatic polyamide resin having at least a repeating unit structure derived from an aromatic dicarboxylic compound and an aliphatic diamine compound with the alkyl carbon number in the range of from 9 to 13.

9 Claims, 3 Drawing Sheets

TUBULAR MEMBER, TUBULAR MEMBER UNIT, INTERMEDIATE TRANSFER MEMBER, AND IMAGE FORMING APPARATUS

CROSS-REFERENCE TO RELATED APPLICATIONS

This application is based on and claims priority under 35 USC 119 from Japanese Patent Application Nos. 2011-66473 filed Mar. 24, 2011 and 2011-136343 filed Jun. 20, 2011.

BACKGROUND

Technical Field

The present invention relates to a tubular member, a tubular member unit, an intermediate transfer member, and an image forming apparatus.

SUMMARY

According to an aspect of the invention, there is provided a tubular member formed of a polyamide resin layer including carbon black and a semi-aromatic polyamide resin having at least a repeating unit structure derived from an aromatic dicarboxylic compound and an aliphatic diamine compound with the alkyl carbon number in the range of from 9 to 13.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail with reference to the accompanying drawings.

Tubular Member

Figure 1:
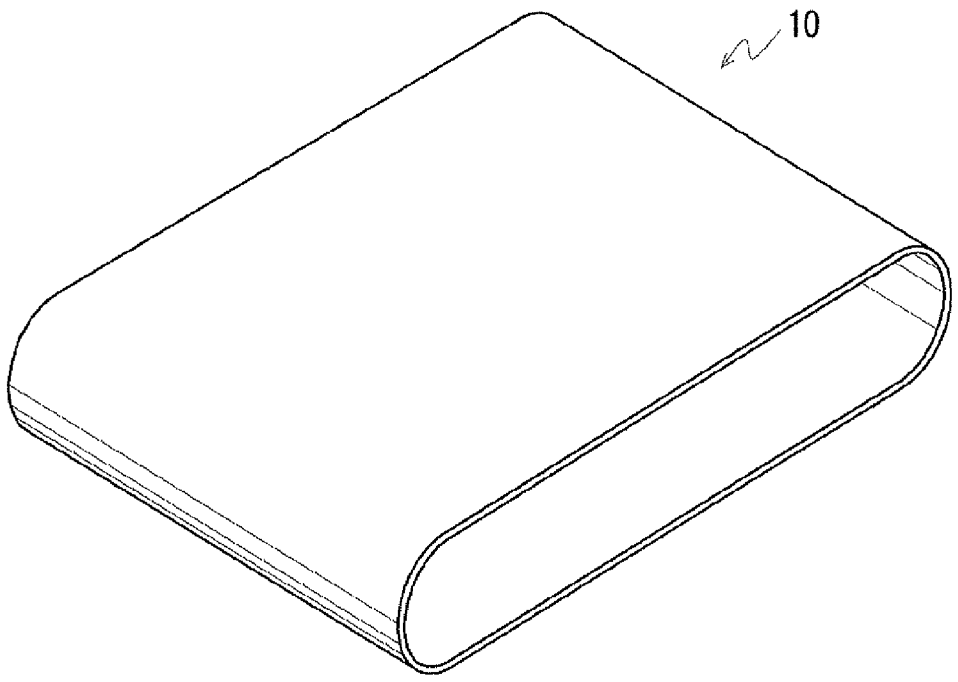
FIG. 1 is a perspective view schematically illustrating a tubular member according to an exemplary embodiment of the invention.

FIG. 1 is a perspective view schematically illustrating a tubular member according to an exemplary embodiment of the invention.

A tubular member 10 (hereinafter, referred to as an endless belt) according to this exemplary embodiment has, for example, an endless shape as shown in FIG. 1 and is formed of, for example, a single-layered structure of a polyamide resin layer with a thickness of from 50 μm to 200 μm.

The polyamide resin layer includes carbon black and a semi-aromatic polyamide resin (hereinafter, also simply referred to as a "semi-aromatic polyamide resin") having at least a repeating unit structure derived from an aromatic dicarboxylic compound and an aliphatic diamine compound with alkyl groups in the range of from 9 to 13.

An endless belt formed of a polyamide resin has been known.

However, the polyamide resin is greatly influenced by a mechanical change due to the absorption of water and the endless belt formed of the polyamide resin is easily lowered in compressive elastic modulus due to the absorption of water.

When the compressive elastic modulus is lowered due to the absorption of water, attachments (particularly, small-diameter particle-like materials) attached to the surface of the endless belt are easily embedded therein and the attachments are difficult to remove, whereby the cleaning performance is deteriorated.

In order to suppress the lowering in compressive elastic modulus due to the absorption of water, it can be considered that a filler (for example, carbon black) is blended thereto, but the suppression is not satisfactory. When the blending quantity increases, the surface of the endless belt can be easily roughened, whereby the cleaning performance is deteriorated or the flexibility resistance is lowered.

On the contrary, in the endless belt 10 according to this exemplary embodiment, by employing the polyamide layer including the semi-aromatic polyamide resin and the carbon black as the polyamide resin layer constituting the endless belt, the lowering in cleaning performance is suppressed.

The reasons are uncertain, but are considered to be the following.

The semi-aromatic polyamide resin is a material satisfying mechanical characteristics as a tubular member, which is higher in compressive elastic modulus than a full-aliphatic polyamide resin and is more excellent in the flexibility necessary for a tubular member than a full-aromatic polyamide resin.

The water absorption of the semi-aromatic polyamide resin is considered to depend on the amino group concentration in a molecule. That is, when the amino group concentration of the semi-aromatic polyamide resin is excessively high, it is considered that the compressive elastic modulus is easily lowered due to the absorption of water.

On the other hand, the compressive elastic modulus of the semi-aromatic polyamide resin is considered to correspond to the aromatic ring concentration in a molecule. That is, when the aromatic ring concentration in the semi-aromatic polyamide resin is excessively low, it is considered that the mechanical strength is lowered and the compressive elastic modulus is easily lowered. It is also considered that the surface hardness is easily lowered.

On the contrary, when the alkyl carbon number in the aliphatic diamine compound from which the repeating unit structure of the semi-aromatic polyamide resin is derived is set to be 9 or more, it is considered that the amide group concentration in a molecule of the semi-aromatic polyamide resin is suppressed and the lowering of the compressive elastic modulus due to, the absorption of water based on the amide group concentration is suppressed.

On the other hand, when the alkyl carbon number in the aliphatic diamine compound from which the repeating unit structure of the semi-aromatic polyamide resin is derived is set to be equal to or smaller than 13, it is considered that the lowering of the aromatic ring concentration in a molecule of the semi-aromatic polyamide resin is suppressed and the lowering of the compressive elastic modulus based on the aromatic ring concentration is suppressed.

As described above, in the endless belt 10 according to this exemplary embodiment, it is considered that the lowering of the compressive elastic modulus is suppressed and the lowering of the cleaning performance is suppressed.

Particularly, in the endless belt 10 according to this exemplary embodiment, for example, it is considered that the lowering in compressive elastic modulus due to an environmental change (change in the low-humidity environment and the high-humidity environment) is suppressed and the lowering in cleaning performance is suppressed. It is considered that the endless belt has appropriate rigidity and has a mechanical characteristic that the cracking or breaking of an end portion due to the repeated deformation is suppressed and thus the lowering in cleaning performance is suppressed.

When the endless belt 10 according to this exemplary embodiment is employed as an endless belt for an image forming apparatus, for example, the embedding of attachments such as external additives of a toner in the endless belt for an image forming apparatus is suppressed and thus the lowering in cleaning performance is suppressed, whereby an image forming apparatus is embodied in which image defects due to the cleaning failure of the endless belt by repeated use thereof is suppressed.

In the tubular member 10 according to this exemplary embodiment, the polyamide resin layer preferably includes carbon black and a semi-aromatic polyamide resin having at least a repeating unit structure derived from the aromatic dicarboxylic compound and the aliphatic diamine compound with the alkyl carbon number in the range of from 9 to 12.

That is, the alkyl carbon number of the aliphatic diamine compound in the semi-aromatic polyamide resin is preferably in the range of from 9 to 12.

Here, in order to achieve the maintainability of electric resistance (specifically, the maintainability of electric resistance due to the repeated use of the belt and the maintainability of electric resistance (that is, the stability in electric resistance) due to a change in applied voltage or an environmental change) in the endless belt having the polyamide resin layer including the polyamide resin and the carbon black, a technique of controlling the crystallization by mixing a crystalline polyamide resin and an amorphous polyamide resin (hereinafter, referred to as "technique 1"), a technique of stabilizing the dispersibility of carbon black by suppressing the resin pyrolysis in melting and kneading by blending a heat-resistant agent (hereinafter, referred to as "technique 2"), and a technique of stabilizing the electric resistance by the parallel use of an electrolyte compound and carbon black (hereinafter, referred to as "technique 3") have been known.

However, in technique 1, the layer separation is caused in the crystalline polyamide resin and the amorphous polyamide resin and thus the electric resistance varies. In technique 2, the electric resistance varies due to the heat-resistant agent remaining in the endless belt after the molding. In technique 3, the electric resistance varies due to the environmental change based on the discharge degradation of the electrolyte compound.

On the contrary, the endless belt 10 according to this exemplary embodiment, since the polyamide layer including carbon black and the semi-aromatic polyamide resin having at least a repeating unit structure derived from the aromatic dicarboxylic compound and the aliphatic diamine compound with the alkyl carbon number in the range of from 9 to 12 is employed as the polyamide resin layer constituting the endless belt, the maintainability in electric resistance is excellent.

The reason is uncertain, but is based on the following.

The polyamide resin layer (the endless belt 10) is obtained by kneading the semi-aromatic polyamide resin and the carbon black and molding the resultant resin composition. The polyamide resin is melted at the time of kneading and molding and is then cooled. At the time of cooling, the polyamide resin is crystallized.

When the polyamide resin is crystallized, it is considered that the carbon black can be easily excluded from the resin and the carbon black forms aggregates. As a result, when the carbon black forms aggregates, it is considered that the aggregates form a conductive path.

On the contrary, when a semi-aromatic polyamide resin including the aliphatic diamine compound with the alkyl carbon number in the range of from 9 to 12 is employed as the semi-aromatic polyamide resin, it is considered that the crystallization due to the cooling is suppressed and the exclusion of the carbon black from the resin is suppressed, whereby the formation of aggregates of the carbon black is suppressed. Accordingly, it is considered that conductive points formed by the carbon black are uniformly scattered without forming a conductive path in the resultant polyamide layer (the endless belt 10).

On the other hand, it is considered that the semi-aromatic polyamide resin has an appropriate intermolecular cohesive force and thus the dispersibility of the carbon black is improved. Accordingly, it is considered that conductive points formed by the carbon black are uniformly scattered without forming a conductive path in the resultant polyamide layer (the endless belt 10).

As a result, in the endless belt 10 according to this exemplary embodiment, by setting the alkyl carbon number of the aliphatic diamine compound in the semi-aromatic polyamide resin to the range of from 9 to 12, it is considered that the conductive points can be easily uniformly scattered and thus the maintainability of electric resistance is excellent.

Specifically, in the endless belt 10 according to this exemplary embodiment, for example, the maintainability of electric resistance due to the repeated use of the belt and the maintainability of electric resistance (that is, the stability in electric resistance) due to the change in applied voltage or the environmental change is achieved.

When the endless belt 10 according to this exemplary embodiment is employed as an endless belt for an image forming apparatus, for example, it is possible to provide an image forming apparatus in which image defects due to the change in electric resistance due to repeated use, the change in applied voltage, or the environmental change is suppressed.

In the endless belt 10 according to this exemplary embodiment, it is preferable that the curve (T-$\log_{10}\eta$ curve) indicating the relationship between the temperature (T (° C.)) and a common logarithm ($\log_{10}\eta$) of the melt viscosity ($\eta$(Pa·s)) at a shear rate of 608 (1/s) in the polyamide resin layer has a slow-sloped region in which a slope ($\Delta \log_{10}\eta/\Delta T$) of equal to or greater than −0.010 and equal to or less than 0 (or equal to or greater than about −0.010 and equal to or less than about 0) is present in the range of from $\log_{10} 200$ to $\log_{10} 1000$, and that the temperature range of the slow-sloped region is equal to or higher than 15° C. (hereinafter, the viscosity characteristic may also be referred to as "a specific viscosity characteristic").

Here, an extrusion molding method is appropriately used to mold a resin composition in a layered structure (a belt shape). In extruding the resin composition by the use of an extrusion molding method, it is preferable that the plasticized resin composition is uniformly extruded in the circumferential direction and the axis direction from die parts of an extruding head with a screw.

Since the extruding screw has a spiral structure, it is considered that it gives certain pulsation to the melted resin composition. Particularly, in a crosshead type, it is considered that since the extruding head changes the flow direction of the resin composition to be perpendicular to the extruding screw, the flow path in the circumferential direction is not uniform and thus the thermal and dynamic histories given to the resin composition varies in the circumferential direction. Even when a mechanism that keeps the temperature in the circumferential direction of the head constant is employed, it is difficult to keep the temperature completely constant with the lapse of time and thus the temperature difference in the circumferential direction occurs in the resin composition, thereby causing a viscosity difference. It is considered that this causes the viscosity difference in the circumferential direction at the die outlet and the viscosity difference in the axis direction (with the lapse of time), whereby the thickness in the circumferential direction and the axis direction is not uniform. When the thickness is not uniform, the resistivity is not also uniform.

Therefore, in order to suppress the non-uniformity in thickness, attention is paid to the fact that the temperature dependence of the viscosity of the resin composition in the endless belt 10 according to this exemplary embodiment has only to be small in a predetermined temperature range capable of being set in the molding process.

That is, in the endless belt 10 according to this exemplary embodiment, when the viscosity characteristic of the resin composition, that is, the polyamide resin layer formed thereof, is set to the above-mentioned specific viscosity characteristic, the region in which the variation in melt viscosity with respect to the temperature of the polyamide resin layer (the resin composition) is suppressed is present in the range corresponding to the variation of the extrusion molding condition, whereby the non-uniformity in thickness and resistivity of the polyamide resin layer is suppressed.

The materials and characteristics of the endless belt 10 according to this exemplary embodiment will be described below.

The polyamide resin layer will be first described.

The polyamide resin layer includes a semi-aromatic polyamide resin and carbon black and further includes other additives as needed.

The semi-aromatic polyamide resin will be described.

The semi-aromatic polyamide resin is a semi-aromatic polyamide resin having at least a repeating unit structure derived from an aromatic dicarboxylic compound and an aliphatic diamine compound with the alkyl carbon number in the range of from 9 to 13.

A specific example of the semi-aromatic polyamide resin is a polycondensate of an aromatic dicarboxylic compound and an aliphatic diamine compound.

The aromatic dicarboxylic compound is a dicarboxylic compound having an aromatic ring (such as a benzene ring, a naphthalene ring, and a biphenyl ring).

Specific examples of the aromatic dicarboxylic compound includes terephthalic acid, isophthalic acid, 2,6-naphthalene dicarboxylic acid, 2,7-naphthalene dicarboxylic acid, 1,4-naphthalene dicarboxylic acid, 1,4-phenylene dioxydiacetic acid, 1,3-phenylene dioxydiacetic acid, dibenzoic acid, 4,4'-oxydibenzoic acid, diphenylmethane-4,4-dicarboxylic acid, diphenylsulfone-4,4-dicarboxylic acid, and 4,4-biphenyl carboxylic acid.

Among these examples, terephthalic acid, isophthalic acid, and 2,6-naphthalene dicarboxylic acid are preferable in view of the economy and the performance of polyamide, and terephthalic acid is more preferable.

The aliphatic diamine compound is an aliphatic diamine compound with the alkyl carbon number (that is, the carbon number) in the range of from 9 to 13 (preferably in the range of from 9 to 12 and more preferably in the range of from 10 to 11).

Here, the alkyl carbon number of the aliphatic diamine compound means the number of carbons in the aliphatic groups (alkyl groups) linked by two amino groups in the aliphatic diamine compound.

In view of the cleaning performance of the endless belt 10, when the alkyl carbon number of the aliphatic diamine compound is less than 9, the amino group concentration in the semi-aromatic polyamide resin is higher and the compressive elastic modulus is lowered due to the absorption of water, whereby the cleaning performance is lowered.

On the other hand, when the alkyl carbon number is greater than 13, the aromatic ring concentration in the semi-aromatic polyamide resin is lowered, the compressive elastic modulus is lowered, and the surface hardness along with the rigidity is lowered, whereby the cleaning performance is lowered.

As a result, by setting the alkyl carbon number in the aliphatic diamine compound to the range of from 9 to 13, the lowering in cleaning performance of the endless belt 10 is suppressed.

In view of the electric resistance of the endless belt 10, when the alkyl carbon number in the aliphatic diamine compound is less than 9, the carbon black is excluded from the semi-aromatic polyamide resin by the crystallization accompanied with the cooling of the semi-aromatic polyamide resin after the melting of the semi-aromatic polyamide resin and the carbon black forms aggregates to form a conductive path, whereby the electric resistance is lowered.

On the other hand, when the alkyl carbon number is greater than 12, the aromatic ring concentration in the semi-aromatic polyamide resin is lowered and the intermolecular cohesive force of the semi-aromatic polyamide resin is lowered, whereby the dispersed state of the carbon black is damaged.

As a result, when the alkyl carbon number in the aliphatic diamine compound is set to the above-mentioned range, the maintainability of the electric resistance of the endless belt 10 is improved.

Specific examples of the aliphatic diamine compound include straight-chain aliphatic alkylene diamines (such as 1,9-nonane diamine, 1,10-decane diamine, 1,11-undecane diamine, and 1,12-dodecane diamine), branched-chain aliphatic alkylene diamines (such as 2,2,4-trimethyl-1,6-hexane diamine, 2,4,4-trimethyl-1,6-hexane diamine, 2,4-diethyl-1,6-hexane diamine, 2,2-dimethyl-1,7-heptane diamine, 2,3-dimethyl-1,7-heptane diamine, 2,4-dimethyl-1,7-heptane diamine, 2,5-dimethyl-1,7-heptane diamine, 2-methyl-1,8-octane diamine, 3-methyl-1,8-octane diamine, 4-methyl-1,8-octane diamine, 1,3-dimethyl-1,8-octane diamine, 1,4-dimethyl-1,8-octane diamine, 2,4-dimethyl-1,8-octane diamine, 3,4-dimethyl-1,8-octane diamine, 4,5-dimethyl-1,8-octane diamine, 2,2-dimethyl-1,8-octane diamine, 3,3-dimethyl-1,8-octane diamine, 4,4-dimethyl-1,8-octane diamine, and 5-methyl-1,9-nonane diamine), and cyclic aliphatic alkylene diamines (such as 1-amino-3-aminomethyl-3,5,5-trimethyl cyclohexane, and 1-amino-3-aminomethyl-2,5,6-trimethyl cyclohexane).

Among these examples, for example, in view of the polyamine performance or the environmental protection, 1,10-decane diamine (decamethylene diamine) and 1,11-undecane diamine can be preferably used and 1,10-decane diamine (decamethylene diamine) can be more preferably used.

An example of the semi-aromatic polyamide resin is a polycondensate of the aromatic dicarboxylic compound and the aliphatic diamine compound. Without damaging the function, a product (for example, polyamide-polyether block copolymer) obtained by polymerizing another monomer with the polycondensate may be used.

Here, in the polyamide-polyether block copolymer, an example of the polyether constituting a polyether chain is polyalkylene glycol with a carbon number of alkylene in the range of from 2 to 6 (preferably in the range of from 2 to 4).

Specific examples thereof include polytetramethylene glycol (polytetramethylene ether glycol), polyethylene glycol, polypropylene glycol, and copolymers thereof (such as polyethylene oxide-polypropylene oxide block copolymers).

The crystallinity of the semi-aromatic polyamide resin is, for example, equal to or less than 30% (or equal to or less than about 30%), preferably equal to or less than 25%, and more preferably equal to or less than 20%.

When the crystallinity is excessively high, the carbon black is excluded from the semi-aromatic polyamide resin due to the crystallization accompanied with the cooling after the melting of the semi-aromatic polyamide resin and thus the carbon black can easily form aggregates.

Accordingly, as the crystallinity becomes lower, it is considered that the formation of aggregates of the carbon black is more suppressed and the carbon black is more densely and uniformly dispersed.

On the other hand, in the semi-aromatic polyamide resin, it is considered that high-strength parts originating from crystalline parts and flexible parts originating from amorphous parts are balanced to guarantee the strength and the toughness. Accordingly, the crystallinity (the lower limit) of the semi-aromatic polyamide resin is preferably equal to or higher than 2% (more preferably equal to or higher than 4%).

The crystallinity is acquired by the X-ray diffraction measurement. Specifically, measurement is made using an X-ray diffractometer (made by Rigaku Corporation), peak resolution analysis is performed on the resultant data using anaylsis software made by Bruker AXS Inc., and the crystallinity is calculated from the crystalline peak area and the amorphous peak area after the peak resolution.

The carbon black will be described below.

Examples of the carbon black include oil furnace black, channel black, and acetylene black.

The primary average particle diameter of carbon black is, for example, equal to or less than 25 nm (or equal to or less than about 25 nm) and preferably equal to or less than 20 nm. By setting the primary average particle diameter to the above-mentioned range, the conductive points based on the carbon black become fine and uniform and the lowering in electric resistance due to the discharge degradation on the surface of the polyamide resin layer (endless belt 10) can be easily suppressed.

From the above-mentioned viewpoint, the primary average particle diameter of the carbon black is preferably smaller. However, when the primary average particle diameter is excessively small, the bulk density decreases to make treatment difficult or the surface area increases and the dispersed materials thus exhibit a thixotropy property. Accordingly, the primary average particle diameter of the carbon black is preferably equal to or greater than 10 nm (more preferably equal to or greater than 12 nm).

The primary average particle diameter of carbon black is measured as follows.

First, the resultant polyamide resin layer (the endless belt 10) is cut by the use of a microtome to acquire a measuring sample with a thickness of 100 nm and the measuring sample is observed by the use of a TEM (Transmissive Electron Microscope). The diameters of 50 carbon black particles are measured and the average value thereof is defined as the primary average particle diameter.

The content of carbon black is, for example, in the range of from 15 parts by mass to 30 parts by mass (or from about 15 parts by mass to about 30 parts by mass) with respect to 100 parts by mass of the semi-aromatic polyamide resin and preferably in the range of from 20 parts by mass to 25 parts by mass.

When the content of carbon black is set to the above-mentioned range, the conductive points of carbon black in the polyamide resin layer (the endless belt 10) are denser and discharge energy applied to the surface of the polyamide resin layer (the endless belt 10) can be more easily dispersed, whereby the deterioration thereof is suppressed.

When the content of carbon black is excessively small, it is difficult to densely form the conductive points in the polyamide resin layer (the endless belt 10). When the content of carbon black is excessively large, the electric resistance becomes excessively low and the polyamide resin layer (the endless belt 10) tends to get brittle.

Other additives will be described below.

Examples of other additives include known additives which are blended into an endless belt of an image forming apparatus, such as an antioxidant used to prevent the thermal degradation of the polyamide resin layer and a surfactant used to improve the fluidity.

The characteristics of the endless belt 10 according to this exemplary embodiment will be described below.

In the endless belt 10 (the polyamide resin layer) according to this exemplary embodiment, the surface resistivity which is measured by applying a voltage of 100 V under the normal-temperature and normal-humidity conditions (at a temperature of 22° C. and a humidity of 55 RH %) is preferably in the range of from 7 log Ω/□ to 13 log Ω/□. Particularly, when the endless belt 10 is employed as an intermediate transfer belt, the surface resistivity is preferably in the range of from 8 log Ω/□ to 12 log Ω/□. When the endless belt is employed as a recording medium transport and transfer belt, the surface resistivity is preferably in the range of from 9 log Ω/□ to 13 log Ω/□.

The surface resistivity is a measured value obtained by applying a voltage of 100 V under the normal-temperature and normal-humidity conditions (at a temperature of 22° C. and a humidity of 55 RH %).

In the endless belt 10 (the polyamide resin layer) according to this exemplary embodiment, the difference between the surface resistivity measured by applying a voltage of 100 V under the normal-temperature and normal-humidity conditions (at a temperature of 22° C. and a humidity of 55 RH %) and the surface resistivity measured by applying a voltage of 1000 V under the normal-temperature and normal-humidity conditions (at a temperature of 22° C. and a humidity of 55 RH %) is preferably equal to or less than 1.0 log Ω/□.

In the endless belt 10 (the polyimide resin layer) according to this exemplary embodiment, the difference between the surface resistivity measured by applying a voltage of 100 V under the low-temperature and low-humidity conditions (at a temperature of 10° C. and a humidity of 10 RH %) and the surface resistivity measured by applying a voltage of 100 V under the high-temperature and high-humidity conditions (at a temperature of 30° C. and a humidity of 85 RH %) is preferably equal to or less than 1.0 log Ω/□.

Here, the surface resistivity is measured using a circular electrode (a UR probe of HIRESTA IP made by Mitsubishi Petrochemical Co., Ltd., with an outer diameter of a cylindrical electrode of ϕ16 mm, an inner diameter of a ring-like electrode part of ϕ30 mm, and an outer diameter of ϕ40 mm) on the basis of the JIS-K-6911 (1995) by placing a measuring sample on an insulating plate, applying a target voltage thereto under a target conditions, and measuring a current flowing from the outer diameter to the inner diameter in 5 seconds after the application of the voltage by the use of a microammeter R8340A made by Advantest Corporation, and calculating the surface resistance value acquired from the current value.

In the endless belt 10 (the polyamide resin layer) according to this exemplary embodiment, the compressive elastic modulus at the time of saturated absorption of water is, for example, equal to or greater than 3500 MPa (preferably in the range of from 3700 MPa to 9000 MPa and more preferably in the range of from 4000 MPa to 7500 MPa).

When the compressive elastic modulus at the time of saturated absorption of water in the endless belt 10 (the polyamide resin layer) is set to the above-mentioned range, it means that the lowering of the compressive elastic modulus due to the absorption of water is suppressed. Accordingly, the lowering in cleaning performance (the cleaning performance at the time of the absorption of water due to the environmental change) is suppressed.

In the endless belt 10 (the polyamide resin layer) according to this exemplary embodiment, the difference between the compressive elastic modulus E1 at the normal humidity and the compressive elastic modulus E2 at the time of the saturated absorption of water preferably satisfies E1-E2≤1500 (more preferably E1-E2≤1300 and still more preferably E1-E2≤1100).

When the difference E1-E2 in the endless belt 10 (the polyamide resin layer) is in the above-mentioned range, it means that the variation in compressive elastic modulus due to the environmental change (the change in the low-humidity condition and the high-humidity condition) is small. Accordingly, the variation in cleaning performance due to the environmental change (the change in the low-humidity condition and the high-humidity condition) is reduced.

The compressive elastic modulus at the time of the saturated absorption of water in the endless belt 10 (the polyamide resin layer) or the difference between the compressive elastic modulus E1 at the normal humidity and the compressive elastic modulus E2 at the time of the saturated absorption of water satisfies the above-mentioned range by employing the polyamide resin layer including carbon black and a semi-aromatic polyamide resin having at least a repeating unit structure derived from an aromatic dicarboxylic compound and an aliphatic diamine compound with the alkyl carbon number in the range of from 9 to 13.

Regarding the compressive elastic modulus at the time of the saturated absorption of water, a measuring sample taken from the endless belt 10 (the polyamide resin layer) is retained in water for 3 days, the measuring sample is taken out of water, a compressing load is applied thereto up to a compression depth of 1 μm using a "dynamic micro-hardness tester" made by Shimadzu Corporation under the normal-temperature and normal-humidity conditions (at a temperature of 22° C. and a humidity 55 RH %), the load is slowly released, and the compressive elastic modulus is calculated from the load and the variation in growth at that time.

Regarding the compressive elastic modulus at the normal humidity, a measuring sample taken from the endless belt 10 (the polyamide resin layer) is subjected to a compressing load up to a compression depth of 1 μm using a "dynamic micro-hardness tester" made by Shimadzu Corporation under the normal-temperature and normal-humidity conditions (at a temperature of 22° C. and a humidity 55 RH %), the load is slowly released, and the compressive elastic modulus is calculated from the load and the variation in growth at that time.

In the endless belt 10 (the polyamide resin layer) according to this exemplary embodiment, it is preferable that a curve ($T\text{-}\log_{10}\eta$ curve) indicating the relationship between a temperature (T (° C.)) and a common logarithm ($\log_{10}\eta$) of melt viscosity (η(Pa·s)) at a shear rate of 608 (1/s) in the polyamide resin layer has a slow-sloped range in which a slope ($\Delta\log_{10}/\Delta T$) of equal to or greater than −0.010 and equal to or less than 0 (or equal to or greater than about −0.010 and equal to or less than about 0) is present in the range of from $\log_{10}200$ to $\log_{10}1000$, and that the temperature range of the slow-sloped region is equal to or higher than 15° C. (or equal to or higher than about 15° C.).

By satisfying this specific viscosity characteristic, the unevenness in thickness and resistivity of the endless belt 10 (the polyamide resin layer) is suppressed.

The slope of the slow-sloped region is preferably in the range of from −0.010 to 0 and more preferably in the range of from −0.008 to 0.

The temperature range of the slow-sloped region is preferably equal to or higher than 15° C. and more preferably equal to or higher than 20° C.

This specific viscosity characteristic is adjusted depending on the type and molecular weight of the polyamide resin and the type and blending quantity of the carbon black.

Specifically, in order to satisfy the specific viscosity characteristic, for example, the following conditions are set.

Type of polyamide resin: semi-aromatic polyamide resin having at least a repeating unit structure derived from aromatic dicarboxylic compound and aliphatic diamine compound with the alkyl carbon number of from 9 to 13

Molecular weight of polyamide resin: weight-average molecular weight of from 30,000 to 60,000 (preferably the range of from 40,000 to 50,000)

Type of carbon black: furnace black or channel black

Blending quantity of carbon black: from 15 parts by mass to 30 parts by mass (preferably the range of from 20 parts by mass to 25 parts by mass) with respect to 100 parts by mass of semi-aromatic polyamide resin Here, the curve ($T\text{-}\log_{10}\eta$ curve) is obtained by the use of the following measuring instrument and conditions.

Measuring instrument: "Capilograph 1D" made by Toyo Seiki Seisaku-sho Ltd.

Barrel size: diameter of 9.55 mm, effective length of 250 mm

Shear rate: 608 (1/s)

Temperature: 275° C., 300° C., 315° C., 330° C.

In the endless belt 10 (the polyamide resin layer) according to this exemplary embodiment, it is preferable that the difference between the maximum thickness and the minimum thickness is equal to or less than 0.1 time the average thickness, the difference between the maximum surface resistivity (logarithmic value) and the minimum surface resistivity (logarithmic value) is equal to or less than 0.7 log Ω/□, and the number of folding times using an MIT type tester is equal to or greater than 5,000 times.

This characteristic is achieved using the polyamide resin layer including carbon black and a semi-aromatic polyamide resin having at least a repeating unit structure derived from an aromatic dicarboxylic compound and an aliphatic diamine compound with the alkyl carbon number in the range of from 9 to 13 to satisfy the above-mentioned viscosity characteristic.

The method of manufacturing the endless belt 10 according to this exemplary embodiment will be described below.

First, pellets of resin compositions are obtained, for example, by kneading and blending a semi-aromatic polyamide resin and carbon black and other additives as needed by target blending quantities.

The resultant pellets of resin compositions are extruded in a cylindrical shape by the use of an extruder and are cooled and solidified (controlled in crystallization), whereby a cylindrical compact is obtained.

Specifically, for example, the pellets of resin compositions is melted and extruded in a cylindrical shape, the resultant is drawn and rolled, and the inner circumferential surface and the outer circumferential surface of the resin composition extruded in the cylindrical shape are cooled, whereby a cylindrical compact is obtained. At this time, the resin composition flow channel in the extruder may be replaced with inert gas.

The molding can be performed simply and cheaply using the extrusion molding method, compared with the cast method.

Particularly, in the extrusion molding, by cooling and drawing the inner circumferential surface and the outer circumferential surface of the resin composition extruded in a cylindrical shape at the same time, it is considered that the uniformity in crystallization is guaranteed and the tensile state of a resin layer is obtained based on the arrangement of resin molecules by the drawing and the growth of molecular chain. In addition, the smoothness of the surface can be achieved and the surface strength is appropriately improved.

The resultant cylindrical compact is cut with a target width to obtain an endless belt 10.

The above-mentioned endless belt 10 (the polyamide resin layer) according to this exemplary embodiment has a single-layered structure of a polyamide resin layer, but may have a multi-layered structure of two or more layers as long as it includes the polyamide resin layer.

Specifically, for example, the endless belt 10 (the polyamide resin layer) according to this exemplary embodiment may have a multi-layered structure of a base layer and a surface layer (surface release layer) stacked thereon and the polyamide resin layer may be used as at least one of the base layer and the surface layer. Here, when the polyamide resin layer is used as the surface layer, a release material (for example, fluorine compounds (such as a fluorine resin or particles thereof)) may be blended therewith.

An intermediate layer may be disposed between the base layer and the surface layer. Alternatively, the base layer may have a multi-layered structure of two or more layers.

The endless belt 10 (the polyamide resin layer) according to this exemplary embodiment can be employed, for example, as a belt (such as an intermediate transfer belt or a recording medium transport and transfer belt) of an image forming apparatus.

Tubular Member Unit

Figure 2:
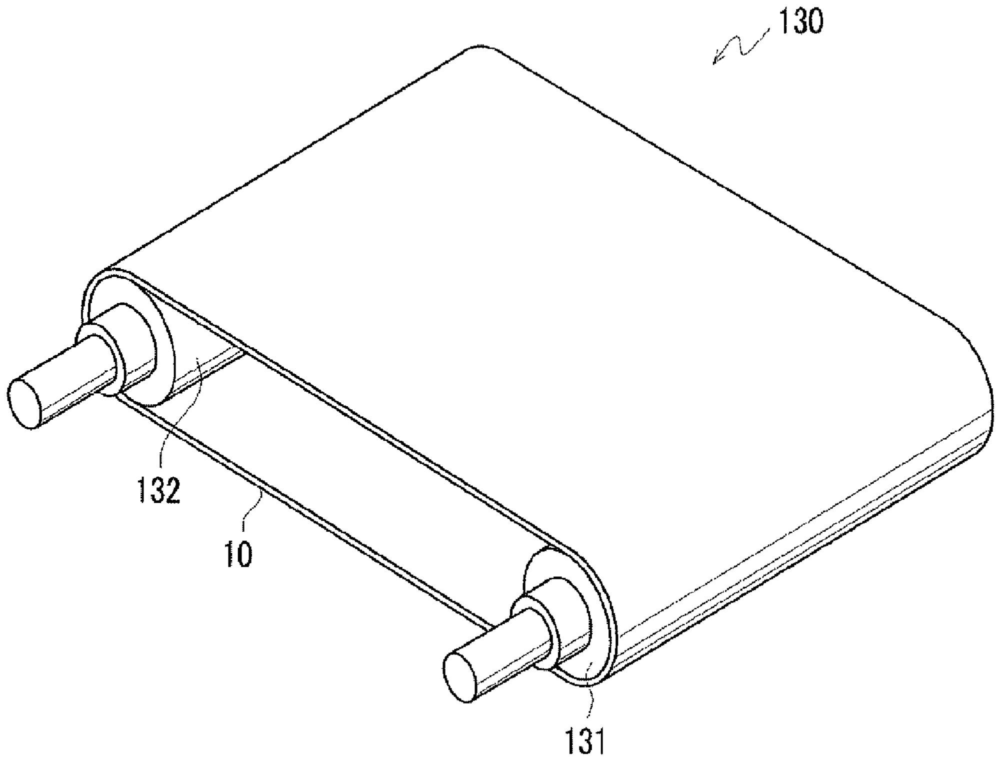
FIG. 2 is a perspective view schematically illustrating a tubular member unit according to an exemplary embodiment of the invention.

FIG. 2 is a perspective view schematically illustrating a tubular member unit according to this exemplary embodiment.

As shown in FIG. 2, a tubular member unit 130 (hereinafter, referred to as an endless belt unit) according to this exemplary embodiment includes the endless belt 10 according to this exemplary embodiment. For example, the endless belt 10 is hanged (hereinafter, also referred to as "suspended") on a driving roll 131 and a driven roll 132 disposed to face each other with a tension applied thereto.

Regarding the endless belt unit 130 according to this exemplary embodiment, when the endless belt 10 is employed as an intermediate transfer member, a roll primarily transferring a toner image on the surface of a photosensitive member (the image holding member) to the endless belt 10 and a roll additionally secondarily transferring the toner image transferred to the endless belt 10 to a recording medium are disposed as the rolls suspending the endless belt 10.

The number of rolls suspending the endless belt 10 is not limited and can be determined depending on its usage. The endless belt unit 130 having this configuration is assembled into an apparatus and the suspended endless belt 10 also rotates with the rotation of the driving roll 131 and the driven roll 132.

Image Forming Apparatus

An image forming apparatus according to this exemplary embodiment includes an image holding member, a charging unit that charges the surface of the image holding member, a latent image forming unit that forms a latent image on the charged surface of the image holding member, a developing unit that develops the latent image formed on the surface of the image holding member with a toner to form a toner image, a transfer member that transfers the toner image to a recording medium, and a fixing unit that fixes the toner image transferred to the recording medium. The transfer unit includes the endless belt according to this exemplary embodiment.

Specifically, the image forming apparatus according to this exemplary embodiment has, for example, a configuration in which the transfer unit includes an intermediate transfer member, a primary transfer unit that primarily transfers the toner image formed on the image holding member to the intermediate transfer member, and a secondary transfer unit that secondarily transfers the toner image transferred to the intermediate transfer member to a recording medium and the endless belt according to this exemplary embodiment is employed as the intermediate transfer member.

The image forming apparatus according to this exemplary embodiment has, for example, a configuration including a transport and transfer member (transport and transfer belt) that transports a recording medium and a transfer unit that transfers a toner image formed on an image holding member to the recording medium transported by the transport and transfer member and in which the endless belt according to this exemplary embodiment is employed as the transport and transfer member.

Examples of the image forming apparatus according to this exemplary embodiment include a monochrome image forming apparatus in which only a monochromic toner is contained in a developing device, a color image forming apparatus in which toner images held on an image holding member are repeatedly primarily transferred to an intermediate transfer member, and a tandem type color image forming apparatus in which plural image holding members having a developing device for each color are arranged in series over an intermediate transfer member.

The image forming apparatus according to this exemplary embodiment will be described below with reference to the accompanying drawing.

Figure 3:
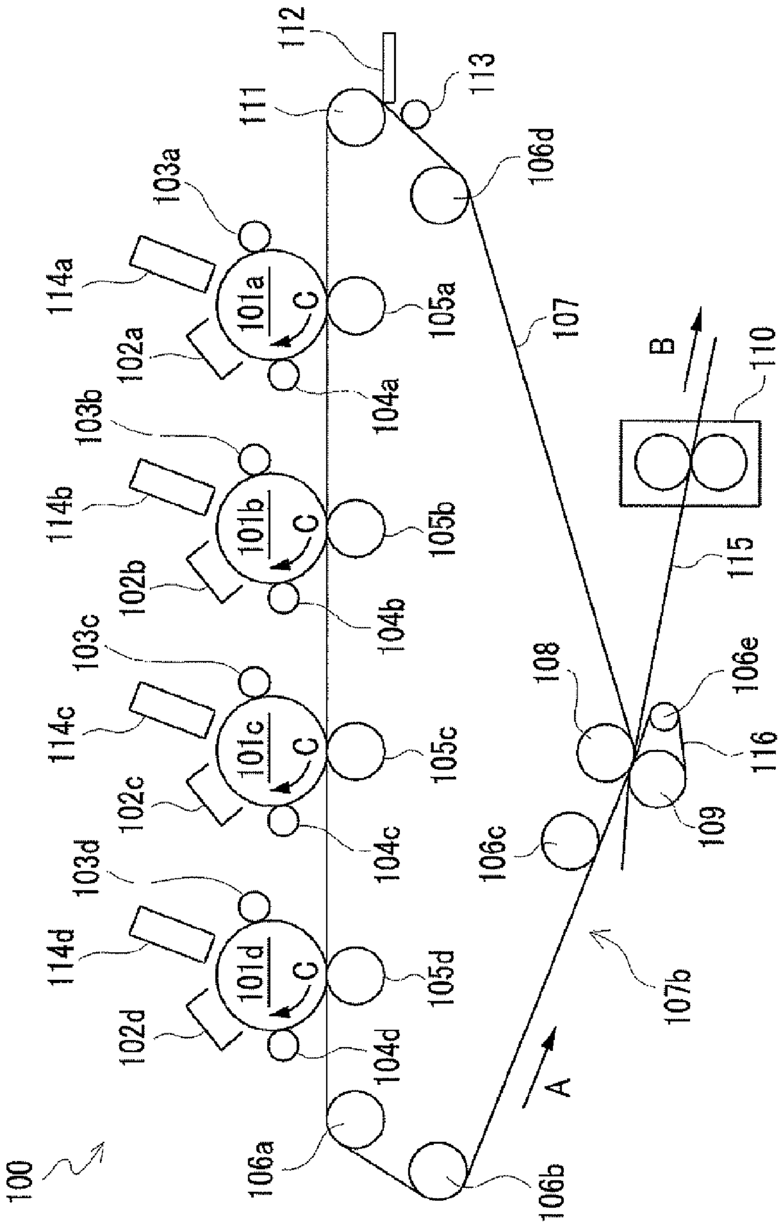
FIG. 3 is a diagram schematically illustrating the configuration of an image forming apparatus according to an exemplary embodiment of the invention.

FIG. 3 is a diagram schematically illustrating the configuration of the image forming apparatus according to this exemplary embodiment.

As shown in FIG. 3, an image forming apparatus 100 according to this exemplary embodiment is of a tandem type, where charging devices 102*a* to 102*d*, exposing devices 114*a* to 114*d*, developing devices 103*a* to 103*d*, primary transfer devices (primary transfer rolls) 105*a* to 105*d*, image holding member cleaning devices 104*a* to 104*d* are arranged around four image holding members 101*a* to 101*d* each formed of a photoelectric photoreceptor, respectively. The image forming apparatus may further include an erasing device that removes a residual potential remaining on the surface of each of the image holding members 101*a* to 101*d* after the transfer.

An intermediate transfer belt 107 is supported with a tension by support rolls 106*a* to 106*d*, a driving roll 111, and a backup roll 108, which form a tubular member unit 107*b*. Through the use of the support rolls 106*a* to 106*d*, the driving roll 111, and the backup roll 108, the intermediate transfer belt 107 can move in the direction of arrow A over the image holding members 101*a* to 101*d* and the primary transfer rolls 105*a* to 105*d* while coming in contact with the surfaces of the image holding members 101*a* to 101*d*. In the primary transfer rolls 105*a* to 105*d*, parts coming in contact with the image holding members 101*a* to 101*d* with the intermediate transfer belt 107 interposed therebetween serve as primary transfer parts and a primary transfer voltage is applied to the contact parts of the primary transfer rolls 105*a* to 105*d* with the image holding members 101*a* to 101*d*.

In the secondary transfer device, the backup roll 108 and a secondary transfer roll 109 are disposed to face each other with the intermediate transfer belt 107 and a secondary transfer belt 116 interposed therebetween. A recording medium 115 such as a sheet of paper moves in the direction of arrow B in the region interposed between the intermediate transfer belt 107 and the secondary transfer roll 109 while coming in contact with the surface of the intermediate transfer belt 107 and then passes through a fixing device 110. A part in which the secondary transfer roll 109 comes in contact with the backup roll 108 with the intermediate transfer belt 107 and the secondary transfer belt 116 interposed therebetween serves as a secondary transfer part and a secondary transfer voltage is applied to the contact part of the secondary transfer roll 109 with the backup roll 108. Intermediate transfer belt cleaning devices 112 and 113 are disposed to come in contact with the intermediate transfer belt 107 after the transfer.

In the color image forming apparatus 100 having this configuration, the image holding member 101*a* rotates in the direction of arrow C, the surface thereof is charged by the charging device 102*a*, and then a first-color electrostatic latent image is formed by the exposing device 114*a* such as a laser beam. The formed electrostatic latent image is developed with a toner by the developing device 103*a* containing the toner corresponding to the first color to form a toner image. The developing devices 103*a* to 103*d* contain toners (such as yellow, magenta, cyan, and black) corresponding to the electrostatic latent images of the respective colors.

The toner image formed on the image holding member 101*a* is electrostatically transferred (primarily transferred) to the intermediate transfer belt 107 by the primary transfer roll 105*a* when passing through the primary transfer part. Thereafter, second-color, third-color, and fourth-color toner images are primarily transferred to the intermediate transfer belt 107 holding the first-color toner image by the primary transfer rolls 105*b* to 105*d* so as to sequentially overlap with each other, whereby a color multiple toner image is finally obtained.

The multiple toner image formed on the intermediate transfer belt 107 is electrostatically transferred to the recording medium 115 in a bundle when passing through the secondary transfer part. The recording medium 115 to which the toner image is transferred is transported to the fixing device 110, is subjected to fixation by heating and/or pressurization, and is then discharged from the apparatus.

The residual toner is removed from the image holding members 101*a* to 101*d* after the primary transfer by the image holding member cleaning devices 104*a* to 104*d*. On the other hand, the residual toner is removed from the intermediate transfer belt 107 after the secondary transfer by the intermediate transfer belt cleaning devices 112 and 113 and a next image forming process is prepared for.

Image Holding Member

Known photoelectric photoreceptors are widely used as the image holding members 101*a* to 101*d*. An inorganic photoreceptor of which the photosensitive layer is formed of an inorganic material or an organic photoreceptor of which the photosensitive layer is formed of an organic material is used as the photoelectric photoreceptors. Regarding the organic photoreceptor, a multi-layered organic photoreceptor in which a charge generating layer generating electric charges by exposure and a charge transport layer transporting the electric charges are stacked or a single-layered organic photoreceptor having both an electric charge generating function and an electric charge transporting function can be suitably used. Regarding the inorganic photoreceptor, an inorganic photoreceptor of which a photosensitive layer is formed of amorphous silicon can be suitably used.

The shape of the image holding member is not particularly limited and known shapes such as a cylindrical drum shape, a sheet shape, or a plate shape can be employed.

Charging Device

The charging devices 102*a* to 102*d* are not particularly limited and known charging devices such as a contact type charger employing a conductive (where "conductive" in the charging device means that the volume resistivity is less than $10^7$ Ωcm) or semi-conductive (where "semi-conductive" in the charging device means that the volume resistivity is in the range of from $10^7$ to $10^{13}$ Ωcm) roller, brush, film, rubber blade, or the like and a scorotron charger or a corotron charger using corona discharge can be widely used. Among these, a contact type charger is preferably used.

The charging devices 102*a* to 102*d* normally apply a DC current to the image holding members 101*a* to 101*d* but may apply an AC current, which is additionally superimposed on the DC current, thereto.

Exposing Device

The exposing devices 114*a* to 114*d* are not particularly limited, and examples thereof include known exposing devices such as optical instruments exposing the surfaces of the image holding members 101*a* to 101*d* with a light source such as a semiconductor laser beam, an LED (Light Emitting Diode) beam, or a liquid crystal shutter beam or via a polygon mirror from the light source to form a desired image.

Developing Device

The developing devices 103*a* to 103*d* can be selected depending on the purpose and examples thereof include known developing devices performing development in a contact type or a non-contact type by the use of a single-component developer or a two-component developer through the use of a brush or a roller.

Primary Transfer Roll

The primary transfer rolls 105*a* to 105*d* may have a single-layered structure or a multi-layered structure. For example, in case of the single-layered structure, a roll structure is provided which conductive particles of carbon black or the like are appropriately mixed into foamed or non-foamed silicone rubber, urethane rubber, or EPDM.

Image Holding Member Cleaning Device

The image holding member cleaning devices 104*a* to 104*d* serve to remove the residual toner attached to the surfaces of the image holding members 101*a* to 101*d* after the primary transfer process and a brush cleaning or a roll cleaning is used in addition to a cleaning blade. The cleaning blade is preferably used. Examples of the material of the cleaning blade include urethane rubber, neoprene rubber, and silicone rubber.

Secondary Transfer Roll

The layer structure of the secondary transfer roll 109 is not particularly limited. For example, in case of a three-layered structure, the roll includes a core layer, an intermediate layer, and a coating layer coating the surface thereof. The core layer is formed of the foam of silicone rubber, urethane rubber, or EPDM, or the like in which conductive particles are dispersed, and the intermediate layer is formed of the non-foam thereof. Examples of the material of the coating layer include a tetrafluoroethylene-hexafluoropropylene copolymer and a perfluoro alkoxy resin. The volume resistivity of the second transfer roll 109 is preferably equal to or less than $10^7$ Ωcm. A two-layered structure in which the intermediate layer is excluded may be employed.

Backup Roll

The backup roll 108 forms a counter electrode of the secondary transfer roll 109. The layer structure of the backup roll 108 may be one of a single-layered structure or a multi-layered structure. For example, in case of a single-layered structure, a roll is provided in which conductive particles of carbon black or the like are appropriately mixed into silicone rubber, urethane rubber, EPDM, or the like. In case of a two-layered structure, a roll is provided in which the outer circumferential surface of an elastic layer formed of the above-mentioned rubber materials is coated with a high-resistance layer.

A voltage of 1 kV to 6 kV is normally applied to the shafts of the backup roll 108 and the secondary transfer roll 109. Without applying a voltage to the shaft of the backup roll 108, a voltage may be applied to a conductive electrode member in contact with the backup roll 108 and the secondary transfer roll 109. Examples of the electrode member include a metal roll, a conductive rubber roll, a conductive brush, a metal plate, and a conductive resin plate.

Fixing Device

Known fixing devices such as a thermal roller fixing device, a pressing roller fixing device, and a flash fixing device are widely used as the fixing device 110.

Intermediate Transfer Belt Cleaning Device

A brush cleaning or a roll cleaning is used as the intermediate transfer belt cleaning devices 112 and 113 in addition to a cleaning blade. The cleaning blade is preferably used. Examples of the material of the cleaning blade include urethane rubber, neoprene rubber, and silicone rubber.

EXAMPLES

The invention will be specifically described below with reference to examples, but the invention is not limited to the examples.

In the following description, "phr" represents parts by mass with respect to 100 parts by mass of a resin.

Examples A

Example A1

22 phr of carbon black (Monark_M880 made by Cabot Corporation, with a primary average particle diameter of 15 nm) is added to a semi-aromatic polyamide resin (F2001 made by Daicel-Evonik Ltd., a condensate of a terephthalic acid as an aromatic dicarboxylic compound and 1,10-decane diamine as an aliphatic diamine compound, in which the aromatic ring of the aromatic dicarboxylic compound is a benzene ring and the alkyl carbon number in the aliphatic diamine compound is 10), a barrel heating temperature is gradually set so that a barrel located at the most downstream position (on the material supply side) is slowly heated from 270° C. to the highest heating temperature of 300° C., the resultant is melted and kneaded at a screw torque of 121 Nm by the use of a biaxial melt kneader (made by Parker Corporation), a molten strand (a rope shape with a diameter of about 2 mm) discharged from an outlet of the kneader is made to pass through a water bath and is cooled, and the cooled and solidified strand is inserted into a pelletizer and is cut, whereby mixture resin pellets with a cut size of about 5 mm are obtained.

"phr" represents the mass of a material with respect to 100 parts by mass of a resin.

The obtained mixture resin pellets are input to a material supply hopper in a uniaxial extrusion molding machine, the barrel temperature is set to 280°, the temperature of a tubular die discharging a resin is set to 300° C., the resultant is melted and extruded while being wound by a winder, the inner circumferential surface of the cylindrical molten resin is then brought into contact with the surface of a cylindrical sizing die with ϕ278 mm, a film cooled by blowing cooling air to the outer circumferential surface thereof is wound in a cylinder shape, and the resultant is cut by the use of a cutter, whereby an extruded belt (endless belt) with a diameter of ϕ277.9 mm and a width of 350 mm is obtained.

Example A2

An extruded belt (endless belt) is obtained in the same way as in Example A1, except that a semi-aromatic polyamide resin (N1000D made by Kuraray Co., Ltd., a condensate of a terephthalic acid as an aromatic dicarboxylic compound and 1-9-nonane diamine/2-methyl-1,8-octane diamine as an aliphatic diamine compound, in which the aromatic ring of the aromatic dicarboxylic compound is a benzene ring and the alkyl carbon number in the aliphatic diamine compound is 9) is used as the semi-aromatic polyamide resin.

Example A3

An extruded belt (endless belt) is obtained in the same way as in Example A1, except that a semi-aromatic polyamide resin (a condensate of a terephthalic acid as an aromatic dicarboxylic compound and 1,12-dodecane diamine as an aliphatic diamine compound, in which the aromatic ring of the aromatic dicarboxylic compound is a benzene ring and the alkyl carbon number in the aliphatic diamine compound is 12) is used as the semi-aromatic polyamide resin.

Example A4

An extruded belt (endless belt) is obtained in the same way as in Example A1, except that a semi-aromatic polyamide resin (a condensate of a terephthalic acid as an aromatic dicarboxylic compound and 1,13-diaminotridecane as an aliphatic diamine compound, in which the aromatic ring of the aromatic dicarboxylic compound is a benzene ring and the alkyl carbon number in the aliphatic diamine compound is 13) is used as the semi-aromatic polyamide resin.

Example A5

An extruded belt (endless belt) is obtained in the same way as in Example A1, except that the blending quantity of carbon black (Monark M880 made by Cabot Corporation, with a primary average particle diameter of 15 nm) is changed to 15 phr.

Example A6

An extruded belt (endless belt) is obtained in the same way as in Example A1, except that the blending quantity of carbon black (Monark M880 made by Cabot Corporation, with a primary average particle diameter of 15 nm) is changed to 30 phr.

Example A7

An extruded belt (endless belt) is obtained in the same way as in Example A1, except that carbon black (ELFTEX 415 made by Cabot Corporation, with a primary average particle diameter of 25 nm) is used as the carbon black and the blending quantity thereof is set to 23 phr.

Example A8

An extruded belt (endless belt) is obtained in the same way as in Example A1, except that the blending quantity of carbon black (Monark M880 made by Cabot Corporation, with a primary average particle diameter of 15 nm) is changed to 13 phr.

Example A9

An extruded belt (endless belt) is obtained in the same way as in Example A1, except that the blending quantity of carbon black (Monark M880 made by Cabot Corporation, with a primary average particle diameter of 15 nm) is changed to 33 phr.

Comparative Example A1

An extruded belt (endless belt) is obtained in the same way as in Example A1, except that a semi-aromatic polyamide resin (F1001 made by Daicel-Evonik Ltd., a condensate of a terephthalic acid as an aromatic dicarboxylic compound and hexamethylene diamine as an aliphatic diamine compound, in which the aromatic ring of the aromatic dicarboxylic compound is a benzene ring and the alkyl carbon number in the aliphatic diamine compound is 6) is used as the semi-aromatic polyamide resin.

Comparative Example A2

An extruded belt (endless belt) is obtained in the same way as in Example A1, except that a semi-aromatic polyamide resin (a condensate of a terephthalic acid as an aromatic dicarboxylic compound and 1,14-diaminotetradecane as an aliphatic diamine compound, in which the aromatic ring of the aromatic dicarboxylic compound is a benzene ring and the alkyl carbon number in the aliphatic diamine compound is 14) is used as the semi-aromatic polyamide resin.

Comparative Example A3

An extruded belt (endless belt) is obtained in the same way as in Example A1, except that an aliphatic polyamide resin (Nylon 12 (3030XA made by Ube Industries Ltd.), in which the alkyl carbon number in the aliphatic diamine compound is 12) is used instead of the semi-aromatic polyamide resin.

Evaluation

Repeated Use Characteristic

The endless belts obtained in Examples A are mounted as an intermediate transfer belt on an image forming apparatus "C2250 made by Fuji Xerox Co., Ltd.", 50,000 sheets of images are continuously printed under the low-temperature and low-humidity conditions of 10° C. and 10% RH (under the conditions in which discharge based on the peeling of a sheet from the surface of the intermediate transfer belt can easily occur at the time of transfer), and then a halftone image (magenta 30%) is evaluated in image quality.

The surface resistivity (at the normal temperature and the normal humidity (22° C. and 55% RH) and with an applied voltage of 100 V) of the endless belts (the intermediate transfer belts) is measured before and after the continuous printing of 50,000 sheets of images.

Here, the image quality is evaluated using the following criteria.

A: Image density is not lowered.

B: Image density is slightly lowered.

C: Image density is lowered (at a non-allowable level).

Environment Dependence

In the endless belts obtained in the examples, the surface resistivity measured by applying a voltage of 100 V under the low-temperature and low-humidity conditions (at a temperature of 10° C. and a humidity of 10 RH %) and the surface resistivity measured by applying a voltage of 100 V under the high-temperature and high-humidity conditions (at a temperature of 30° C. and a humidity of 85 RH %) are measured and the difference therebetween is evaluated as the environment dependence.

In the endless belts obtained in the examples, the surface resistivity measured by applying a voltage of 100 V under the normal-temperature and normal-humidity conditions (at a temperature of 22° C. and a humidity of 55 RH %) and the surface resistivity measured by applying a voltage of 1000 V under the normal-temperature and normal-humidity conditions (at a temperature of 22° C. and a humidity of 55 RH %) are measured and the difference therebetween is evaluated as the environment dependence.

Crystallinity

The crystallinity of the polyamide resin in the endless belts (the polyamide resin layers) obtained in the examples is measured by the use of the following instrument and measuring conditions.

Instrument: X-ray diffraction analyzer XRD 6100 made by Shimadzu Corporation

Measuring method: θ-2θ concentration technique

X-ray source: Cukα 40 kV-40 mA

Scanning range: 2θ angle scanning 10° to 35°

Evaluation of Compressive Elastic Modulus

In the endless belts obtained in the examples, the compressive elastic modulus E1 at the normal humidity, the compressive elastic modulus E2 at the time of the saturated absorption of water, and the difference (E1-E2) therebetween are measured.

Cleaning Performance

The endless belts obtained in the examples are mounted as an intermediate transfer belt on an image forming apparatus "C2250 made by Fuji Xerox Co., Ltd.", 50,000 sheets of images are continuously printed under the high-temperature and high-humidity conditions of 28° C. and 85% RH, and then a halftone image (magenta 30%) is evaluated in cleaning failure.

Here, the cleaning failure is evaluated as the following criteria.

A: Whitening due to cleaning failure does not occur.

B: Whitening due to cleaning failure slightly occurs.

C: Whitening due to cleaning failure markedly occurs.

Evaluation of External Additive Embedment

The endless belts obtained in the examples are mounted as an intermediate transfer belt on an image forming apparatus "C2250 made by Fuji Xerox Co., Ltd.", 50,000 sheets of images are continuously printed under the high-temperature and high-humidity conditions of 28° C. and 85% RH, then a sample with a size of 2 mm×2 mm is cut out from the intermediate transfer belt, the surface of the sample is observed by the use of a scanning electron microscope (FE-SEM S-5500 made by Hitachi Ltd.), and the embedding of external additives are measured.

Here, the embedding of external additives is evaluated as the following criteria.

A: External additives are not embedded.
B: External additives are slightly embedded.
C: External additives are embedded.
D: External additives are markedly embedded.

TABLE 1

| | | Ex. A1 | Ex. A2 | Ex. A3 | Ex. A4 | Ex. A5 | Ex. A6 | Ex. A7 |
|---|---|---|---|---|---|---|---|---|
| Repeated use characteristic | Evaluation of image quality | A | A | A | C | A | A | A |
| | Surface resistivity before image printing (logΩ/□) | 10.9 | 11.1 | 11.2 | 11.2 | 12.0 | 9.5 | 10.4 |
| | Surface resistivity after image printing (50000 sheets printing) (logΩ/□) | 10.8 | 10.8 | 11.0 | 7.9 | 11.8 | 9.3 | 10.2 |
| Environment dependence | Surface resistivity in low-temperature and low-humidity conditions (logΩ/□) | 11.0 | 11.2 | 11.3 | 11.5 | 12.2 | 9.8 | 10.7 |
| | Surface resistivity in high-temperature and high-humidity conditions (logΩ/□) | 10.8 | 10.9 | 11.0 | 10.1 | 11.9 | 9.3 | 10.5 |
| | Difference (logΩ/□) | 0.2 | 0.3 | 0.3 | 1.4 | 0.3 | 0.5 | 0.2 |
| Voltage dependence | Surface resistivity with 100 V (logΩ/□) | 10.9 | 11.1 | 11.2 | 11.4 | 12.0 | 9.5 | 10.4 |
| | Surface resistivity with 1000 V (logΩ/□) | 10.7 | 10.8 | 10.9 | 9.6 | 11.5 | 8.9 | 9.9 |
| | Difference | 0.2 | 0.3 | 0.3 | 1.8 | 0.5 | 0.6 | 0.5 |
| Crystallinity of semi-aromatic polyamide resin | | 8 | 10 | 7 | 31 | 8 | 9 | 9 |
| Compressive elastic modulus | Normal temperature | 5250 | 5200 | 5020 | 4600 | 4558 | 5830 | 5760 |
| | Saturated absorption of water | 4203 | 4500 | 4260 | 3950 | 3500 | 5090 | 4800 |
| | Difference (E1 − E2) | 1047 | 700 | 760 | 650 | 1058 | 740 | 960 |
| Evaluation of cleaning failure | | A | A | A | A | A | A | A |
| Evaluation of external additive embedding | | A | A | A | A | A | A | A |

TABLE 2

| | | Com. Ex. A1 | Com. Ex. A2 | Com. Ex. A3 | Ex. A8 | Ex. A9 |
|---|---|---|---|---|---|---|
| Repeated use characteristic | Evaluation of image quality | C | C | B | B | B |
| | Surface resistivity before image printing (logΩ/□) | 9.2 | 10.5 | 11.2 | 10.9 | 11.1 |
| | Surface resistivity after image printing (50000 sheets printing) (logΩ/□) | 6.8 | 7.6 | 8.4 | 10.5 | 10.6 |
| Environment dependence | Surface resistivity in low-temperature and low-humidity conditions (logΩ/□) | 9.3 | 10.6 | 11.4 | 11.0 | 11.2 |
| | Surface resistivity in high-temperature and high-humidity conditions (logΩ/□) | 7.8 | 9.2 | 9.6 | 10.1 | 10.2 |
| | Difference (logΩ/□) | 1.5 | 1.4 | 1.8 | 0.9 | 1.0 |
| Voltage dependence | Surface resistivity with 100 V (logΩ/□) | 9.0 | 10.4 | 11.3 | 10.9 | 11.1 |
| | Surface resistivity with 1000 V (logΩ/□) | 7.1 | 8.8 | 9.5 | 9.8 | 10.0 |
| | Difference | 1.9 | 1.6 | 1.8 | 1.1 | 1.1 |
| Crystallinity of semi-aromatic polyamide resin | | 35 | 33 | 40 | 11 | 15 |
| Compressive elastic modulus | Normal temperature | 5316 | 3800 | 3021 | 4480 | 6500 |
| | Saturated absorption of water | 2850 | 3200 | 2640 | 3470 | 6020 |
| | Difference (E1 − E2) | 2466 | 600 | 381 | 1100 | 480 |
| Evaluation of cleaning failure | | C | C | C | A | B |
| Evaluation of external additive embedding | | D | C | D | B | A |

It can be seen from the above results that Examples A is higher in compressive elastic modulus, smaller in environmental change, and superior in cleaning failure and embedding of external additives, compared with Comparative Examples A. It can also be seen that Examples A1 to A3 and A5 to A9 employing the semi-aromatic polyamide resin including the aliphatic diamine compound with the alkyl carbon number in the range of from 6 to 12 are superior in repeated use characteristics, environmental dependence, and voltage dependence, compared with Example A4 and Comparative Examples A.

Examples B

Example B1

20 phr of carbon black (Monark_M880 made by Cabot Corporation, with a primary average particle diameter of 15 nm) is added to 100 phr of a semi-aromatic polyamide resin PA9T (N1000D-H made by Kuraray Co., Ltd., a condensate of a terephthalic acid as an aromatic dicarboxylic compound and a copolymer of 1,9-nonane diamine/2-methyl-1,8-octane diamine as an aliphatic diamine compound, in which the alkyl carbon number in the aliphatic diamine compound is 9), a barrel heating temperature is gradually set so that a barrel located at the most upstream position (on the material supply side) is slowly heated from 220° C. to the highest heating temperature of 300° C., the resultant is melted and kneaded at a screw rotation number of 250 rpm and a torque of 140 Nm by the use of a biaxial melt kneader (made by Parker Corporation), a molten strand (a rope shape with a diameter of about 2 mm) discharged from an outlet of the kneader is made to pass through a water bath and is cooled, and the cooled and solidified strand is inserted into a pelletizer and is cut, whereby mixture resin pellets with a cut size of about 5 mm are obtained.

"phr" represents the mass of a material with respect to 100 parts by mass of a resin.

The melted and kneaded mixture resin pellets are heated to 300° C. by the use of a uniaxial extrusion molding machine (made by Mitsuba Mfg Co., Ltd.), the resultant is melted and extruded while being wound (drawn) by a winder, the inner circumferential surface of the cylindrical molten resin is then brought into contact with the surface (at a surface temperature of 80° C.) of a cylindrical sizing die with ϕ160 mm while blowing air (of 25° C.) to the inner circumferential surface and the outer circumferential surface, a film is wound in a cylinder shape, and the resultant is cut by the use of a cutter, whereby an endless belt with a diameter of ϕ160 mm, an average thickness of 100 μm, and a width of 250 mm is obtained.

Example B2

An endless belt with a diameter of ϕ160 mm, an average thickness of 95 μm, and a width of 250 mm is obtained in the same conditions as in Example B1, except that the blending quantity of carbon black is changed to 25 phr.

Example B3

A belt with a diameter of ϕ160 mm, an average thickness of 100 μm, and a width of 250 mm is obtained in the same conditions as in Example B1, except that the blending quantity of carbon black is changed to 22 phr.

Examples B4, B5, and B6

Endless belts with a diameter of ϕ160 mm, average thicknesses shown in Table 3, and a width of 250 mm are obtained in the same conditions as in Example B1, except that 100 phr of a semi-aromatic polyamide resin PA10T (F2001 made by Daicel-Evonik Ltd., a condensate of a terephthalic acid as an aromatic dicarboxylic compound and 1,10-decane diamine as an aliphatic diamine compound, in which the aromatic ring of the aromatic dicarboxylic compound is a benzene ring and the alkyl carbon number in the aliphatic diamine compound is 10) is used instead of the semi-aromatic polyamide resin PAST, and the blending quantity of carbon black, the molding temperature, and the extrusion cooling temperature are set to the conditions shown in Table 3.

Example B7

An endless belt with a diameter of ϕ160 mm, the average thickness shown in Table 3, and a width of 250 mm is obtained in the same conditions as in Example B1, except that the extrusion cooling temperature shown in Table 3.

Comparative Example B1

An endless belt with a diameter of ϕ160 mm, the average thickness shown in Table 3, and a width of 250 mm is obtained in the same conditions as in Example B1, except that 100 phr of an aliphatic polyamide resin (Nylon 12 (3030XA made by Ube Industries Ltd.), in which the alkyl carbon number in the aliphatic diamine compound is 12) is used instead of the semi-aromatic polyamide resin PA9T, and the blending quantity of carbon black, the molding temperature, and the extrusion cooling temperature are set to the conditions shown in Table 3.

Comparative Example B2

An endless belt with a diameter of ϕ160 mm, the average thickness shown in Table 3, and a width of 250 mm is obtained in the same conditions as in Example B1, except that 100 phr of a polybutyrene naphthalate resin (TQB-OT made by Teijin Chemicals Ltd.) is used instead of the semi-aromatic polyamide resin PA9T, and the blending quantity of carbon black, the molding temperature, and the extrusion cooling temperature are set to the conditions shown in Table 3.

Evaluation

Viscosity Characteristic

Samples (resin layers) are taken from the endless belts obtained in the examples and the curve (T-$\log_{10}\eta$ curve) indicating the relationship between a temperature (T (° C.)) and a common logarithm ($\log_{10}\eta$) of the melt viscosity ($\eta$(Pa·s)) at a shear rate of 608 (1/s) is acquired.

The presence of the slow-sloped region in the $\log_{10}\eta$ range of $\log_{10}$ 200 to $\log_{10}$ 1000, the slope ($\Delta \log_{10}/\Delta T$), and the temperature range (° C.) in the slow-sloped region are checked from the acquired curves (T-$\log_{10}\eta$ curves).

The curves (T-$\log_{10}\eta$ curves) are acquired by the use of the following measuring instrument and under the following conditions.

Measuring instrument: "Capilograph 1D" made by Toyo Seiki Seisaku-sho Ltd.

Barrel size: diameter of 9.55 mm, effective length of 250 mm

Shear rate: 608 (1/s)

Temperature: 270° C., 285° C., 300°, 315° C., 330° C.

Crystallinity

The crystallinity of the polyamide resin in the endless belts (the polyamide resin layers) obtained in the examples is measured by the use of the following instrument and measuring conditions.

Instrument: X-ray diffraction analyzer XRD 6100 made by Shimadzu Corporation

Measuring method: θ-2θ concentration technique

X-ray source: CuKα 40 kV-40 mA

Scanning range: 2θ angle scanning 10° to 35°

Evaluation of Belt

Surface Resistivity

The surface resistivity of the endless belts (the polyamide resin layers) obtained in the examples is measured.

The surface resistivity is measured at three points in the axis direction and at eight points in the circumferential direction for each belt and the average value and the difference between the maximum surface resistivity (logarithmic value) and the minimum surface resistivity (logarithmic value) are checked.

Thickness

The thickness of the endless belts (the polyamide resin layers) obtained in the examples is measured.

The thickness is measured at three points in the axis direction and at eight points in the circumferential direction for each belt and the average value (average thickness) and the difference between the maximum thickness and the minimum thickness are checked.

Number of Folding Times using MIT type Tester

The MIT folding number is checked for the endless belts (the polyamide resin layers) obtained in the examples.

The MIT folding number is acquired by measuring the number of breaking times of the test samples with a size of 15.0 mm×110 mm and a weight of 9.8 N by the use of an MIT tester (folding-resistance fatigue tester 530-MIT made by Toyo Seiki Seisaku-sho Ltd.) on the basis of JIS K-8115. The number of samples is set to N=5 for each condition.

The evaluation results are described as a list in Tables 4 and 5.

TABLE 3

| | Belt composition | | | | Molding condition | |
|---|---|---|---|---|---|---|
| | | Carbon black | | | | |
| | Resin type (weight-average molecular weight Mw) | type | Primary particle diameter | Blending quantity | Molding temperature | Extrusion cooling temperature |
| Example B1 | Semi-aromatic polyamide resin PA9T (Mw = 50000) | M880 | 15 nm | 20 phr | 300° C. | 80° C. |
| Example B2 | Semi-aromatic polyamide resin PA9T (Mw = 50000) | M880 | 15 nm | 25 phr | 300° C. | 80° C. |
| Example B3 | Semi-aromatic polyamide resin PA9T (Mw = 50000) | M880 | 15 nm | 22 phr | 300° C. | 80° C. |
| Example B4 | Semi-aromatic polyamide resin PA10T (Mw = 30000) | M880 | 15 nm | 24 phr | 280° C. | 80° C. |
| Example B5 | Semi-aromatic polyamide resin PA10T (Mw = 30000) | M880 | 15 nm | 25 phr | 280° C. | 80° C. |
| Example B6 | Semi-aromatic polyamide resin PA10T (Mw = 30000) | M880 | 15 nm | 21 phr | 280° C. | 80° C. |
| Example B7 | Semi-aromatic polyamide resin PA9T (Mw = 50000) | M880 | 15 nm | 20 phr | 300° C. | 150° C. |
| Comparative Example B1 | Aliphatic polyamide resin PA12 | M880 | 15 nm | 33 phr | 240° C. | 30° C. |
| Comparative Example B2 | Polybutyrene naphthalate | M880 | 15 nm | 20 phr | 270° C. | 50° C. |

TABLE 4

| | Viscosity characteristic | | | | | | | | |
|---|---|---|---|---|---|---|---|---|---|
| | Melt viscosity at 270° C. [Pa s] | Melt viscosity at 285° C. [Pa s] | Melt viscosity at 300° C. [Pa s] | Melt viscosity at 315° C. [Pa s] | Melt viscosity at 330° C. [Pa s] | Presence of slow-sloped region | Slope of slow-sloped region ($\Delta\log_{10}\eta/\Delta T$) | Temperature range of slow-sloped region (° C.) | Crystallinity of resin (%) |
| Example B1 | — | — | 542 | 453 | 236 | Yes | −0.0052 | 15 | 5.5 |
| Example B2 | — | — | 593 | 499 | 256 | Yes | −0.0050 | 15 | 6.2 |
| Example B3 | — | — | 542 | 455 | 240 | Yes | −0.0051 | 15 | 5.8 |
| Example B4 | — | — | 295 | 224 | 132 | Yes | −0.0080 | 15 | 3.7 |
| Example B5 | — | — | 270 | 202 | 132 | Yes | −0.0084 | 15 | 4.0 |
| Example B6 | — | — | 268 | 200 | 130 | Yes | −0.0085 | 15 | 3.8 |
| Example B7 | — | — | 542 | 453 | 236 | Yes | −0.0052 | 15 | 28 |
| Comparative Example B1 | 463 | 316 | 269 | — | — | Yes | −0.0047 | 15 | 35 |
| Comparative Example B2 | 468 | 234 | 126 | — | — | No | — | | 47 |

TABLE 5

| | Belt characteristic | | | | |
|---|---|---|---|---|---|
| | Surface resistivity | | thickness | | |
| | Average logΩ/□ | Difference between maximum surface resistivity (logarithmic value) and minimum surface resistivity (logarithmic value) (logΩ/□) | Average (average thickness) (μm) | Difference between maximum thickness and minimum thickness (μm) | Folding number using MIT tester (times) |
| Example B1 | 10.3 | 0.4 | 100 | 7 | 6000 |
| Example B2 | 9.5 | 0.3 | 95 | 6 | 7500 |
| Example B3 | 9.9 | 0.4 | 100 | 6 | 5000 |
| Example B4 | 10.5 | 0.6 | 95 | 5 | 10000 or more |

TABLE 5-continued

| | Belt characteristic | | | | |
|---|---|---|---|---|---|
| | Surface resistivity | | thickness | | |
| | Average logΩ/□ | Difference between maximum surface resistivity (logarithmic value) and minimum surface resistivity (logarithmic value) (logΩ/□) | Average (average thickness) (μm) | Difference between maximum thickness and minimum thickness (μm) | Folding number using MIT tester (times) |
| Example B5 | 10.3 | 0.4 | 95 | 6 | 10000 or more |
| Example B6 | 11.0 | 0.6 | 100 | 7 | 8000 |
| Example B7 | 9.5 | 0.6 | 100 | 7 | 2300 |
| Comparative Example B1 | 10.5 | 0.4 | 120 | 10 | 4200 |
| Comparative Example B2 | 9.7 | 1.3 | 100 | 14 | 6200 |

It can be seen from the results that Examples B1 to B6 are superior in belt characteristics, compared with Example B7 and Comparative Examples B.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A tubular member formed of a polyamide resin layer, comprising:

carbon black; and a semi-aromatic polyamide resin, the semi-aromatic polyamide resin being a polyamide-polyether block copolymer formed by polymerizing a monomer with a polycondensate of an aromatic dicarboxylic compound and an aliphatic diamine compound with an alkyl carbon number in a range of from 9 to 13;

wherein a curve (T-$\log_{10}$ η curve) indicating a relationship between a temperature (T (° C.)) and a common logarithm ($\log_{10}$ η) of melt viscosity (η(Pa·s)) at a shear rate of 608 (1/s) in the polyamide resin layer has a slow-sloped region in which a slope ($\Delta \log_{10} \eta/\Delta T$) of equal to or greater than about −0.010 and equal to or less than about 0 is present in the range of from $\log_{10}$ 200 to $\log_{10}$ 1000, and the temperature range of the slow-sloped region is equal to or higher than about 15° C.

2. The tubular member according to claim 1, wherein the tubular member is formed of a single-layered structure of the polyamide resin layer or a multi-layered structure of two or more layers having at least the polyamide resin layer.

3. The tubular member according to claim 1, wherein the alkyl carbon number in the aliphatic diamine compound is in a range of from 9 to 12.

4. The tubular member according to claim 1, wherein the polyamide resin layer includes from about 15 parts by mass to about 30 parts by mass of the carbon black with respect to 100 parts by mass of the semi-aromatic polyamide resin.

5. The tubular member according to claim 1, wherein a primary average particle diameter of the carbon black is equal to or less than about 25 nm.

6. The tubular member according to claim 1, wherein a crystallinity of the semi-aromatic polyamide resin is equal to or less than about 30%.

7. A tubular member unit comprising:

the tubular member according to claim 1; and a plurality of rolls on which the tubular member is suspended with a tension applied thereto, wherein the tubular member unit is detachable from an image forming apparatus.

8. An intermediate transfer member formed of the tubular member according to claim 1.

9. An image forming apparatus comprising:

an image holding member;

a charging unit that charges the surface of the image holding member;

a latent image forming unit that forms a latent image on the charged surface of the image holding member;

a developing unit that develops the latent image formed on the surface of the image holding member with a toner to form a toner image;

the intermediate transfer member according to claim 8 to which the toner image formed on the surface of the image holding member is transferred;

a primary transfer unit that primarily transfers the toner image formed on the surface of the image holding member to the surface of the intermediate transfer member;

a secondary transfer unit that secondarily transfers the toner image transferred to the surface of the intermediate transfer member to a recording medium; and a fixing unit that fixes the toner image transferred to the recording medium.

* * * * *